US012521998B2

(12) United States Patent
Kwon et al.

(10) Patent No.: US 12,521,998 B2
(45) Date of Patent: Jan. 13, 2026

(54) FOCUSED SPRAY JET PRINTING SYSTEM

(71) Applicant: Industry-University Cooperation Foundation Soonchunhyang University, Asan-si (KR)

(72) Inventors: Kye Si Kwon, Seoul (KR); Jeong Yeop Jo, Ansan-si (KR)

(73) Assignee: Industry-University Cooperation Foundation Soonchunhyang University, Ansan-si (KR)

(*) Notice: Subject to any disclaimer, the term of this patent is extended or adjusted under 35 U.S.C. 154(b) by 135 days.

(21) Appl. No.: 18/423,371

(22) Filed: Jan. 26, 2024

(65) Prior Publication Data

US 2024/0269991 A1 Aug. 15, 2024

(51) Int. Cl.
*B41J 2/215* (2006.01)

(52) U.S. Cl.
CPC .................................... *B41J 2/215* (2013.01)

(58) Field of Classification Search
CPC ......... B41J 2/01; B41J 2/04; B41J 2/07; B41J 2/17596; B41J 2/215; B05B 12/06; B05B 12/18
See application file for complete search history.

(56) References Cited

U.S. PATENT DOCUMENTS

| | | | | |
|---|---|---|---|---|
| 11,890,872 | B2 * | 2/2024 | Andrews | B41J 2/01 |
| 2018/0304621 | A1 * | 10/2018 | Byun | B41J 2/072 |
| 2019/0143678 | A1 * | 5/2019 | Christenson | B41J 2/175 239/11 |
| 2024/0227399 | A1 * | 7/2024 | Wright | B05B 7/1486 |

FOREIGN PATENT DOCUMENTS

| | | | | |
|---|---|---|---|---|
| KR | 10-1298127 B1 | | 8/2013 | |
| KR | 10-2018-0117801 A | | 10/2018 | |
| KR | 10-2020-0087196 A | | 7/2020 | |
| WO | WO 2022/232608 | * | 11/2022 | B41J 2/14 |

* cited by examiner

*Primary Examiner* — Anh T Vo
(74) *Attorney, Agent, or Firm* — NKL LAW; Jae Youn Kim

(57) ABSTRACT

A focused spray jet printing system according to an exemplary embodiment of the present invention may include an atomization unit which atomizes ink by a carrier gas to make generate atomization droplets; a head unit including a virtual impactor which uniformizes sizes of supply atomization droplets ejected from the atomization unit to eject uniform atomization droplets; a focusing unit which is provided in the head unit to focus the uniform atomization droplets introduced into the head unit with sheath gas to spray the uniform atomization droplets onto a substrate; a sheath MFC which supplies the sheath gas, and a valve unit which is selectively connected to any one of an atomization droplet flow path which is formed in the head unit to flow the uniform atomization droplets to connect the virtual impactor and the focusing unit and a flow path formed at the outside of the head unit to flow the sheath gas.

7 Claims, 10 Drawing Sheets

FOCUSED SPRAY JET PRINTING SYSTEM

CROSS-REFERENCE TO RELATED APPLICATIONS

This application claims the priority of Korean Patent Application No. 10-2023-0020289 filed on Feb. 15, 2023, in the Korean Intellectual Property Office, the disclosure of which is incorporated herein by reference.

BACKGROUND OF THE INVENTION

Field of the Invention

The present invention relates to a focused spray jet printing system, and more particularly, to a focused spray jet printing system which minimizes a change in pressure which is caused in a nozzle when printing using spraying of atomization droplets is turned on or off or constantly maintains a pressure applied to the nozzle.

Description of the Related Art

Generally, an aerosol jet device may be provided for a printing process of manufacturing an organic thin film transistor which is a future display device.

In the printing process using the aerosol jet device, inks are minutely atomized to create droplets (hereinafter, referred to as atomization droplets) and the droplets are focused with a sheath gas to be applied on the substrate without spreading to form a pattern.

The advantage of the aerosol jet printing is that inks of various viscosities may be used for the printing. That is, when the ink is atomized using a pneumatic pressure, inks having low to high viscosities from approximately 1 to 1000 cp may be used.

Further, there is almost no ink flying which is a disadvantage of spray and it is eco-friendly. Accordingly, a width to be printed may be controlled by the nozzle and the sheath gas and a line width of tens of micrometers or less may be implemented.

Further, unlike the inkjet printing, the aerosol jet printing may form continuous line patterns and also implement a minute line width even when a distance between the substrate and the nozzle is 5 mm or larger so that it is possible to form a pattern on a curved substrate. Further, the printing is performed using atomization droplets so that a solvent of the droplets quickly evaporates from the substrate to achieve a higher aspect ratio. Further, even though the printing is performed on the three-dimensional substrate, the droplets rarely flow down.

However, the aerosol jet device for aerosol jet printing continuously sprays atomization droplets so that it is difficult to control the spraying on-off of the atomization droplets.

The simplest control method is to physically suppress jetting stream of the atomization droplets which are continuously discharged, by providing a shutter in front of the nozzle. However, in this case, there is a problem in that sediments of droplets which are continuously accumulated on the shutter need to be periodically removed.

Further, when the optimal position from the substrate of the nozzle is 1 mm to several mm, the smallest spray is focused. However, when the shutter is provided at the outside, it is difficult to perform the printing with the optimal condition.

Further, in the case of the three-dimensional surface, it is difficult to print on various surfaces due to this shutter.

If an inner shutter is used, rather than an outer shutter, when the spraying-off state of the atomization droplets is changed to an on state, it takes a long time to reach a pressure appropriate for spraying the atomization droplets so that the ejection of the atomization droplets is delayed. Therefore, there is a problem in that an initial printing quality after the on-state is deteriorated.

Accordingly, rather than shuttering from the outside, a method of shuttering from an internal flow path is considered to eject atomization droplets to the outside using a separate exhaust unit, rather than a nozzle, when the spraying of the atomization droplets is off.

However, there is a problem to be solved in that when the spraying of the atomization droplets is on or off, a pressure variation is caused in the nozzle, which affects a printing quality so that an inner shuttering method which minimizes the pressure variation during the shuttering process needs to be used.

RELATED ART DOCUMENT

Patent Document (Patent Document 1) Korean Registered Patent No. 10-1298127 (Aug. 13, 2013)

SUMMARY OF THE INVENTION

The present invention was contrived to solve the above-mentioned problem and an exemplary embodiment of the present invention is to provide a focused spray jet printing system which applies an inner flow path switching (shuttering) method to minimize a pressure variation generated in a nozzle during the printing on-off switching (shuttering) to overcome the disadvantage of the outer shuttering method of the related art.

The present invention provides a focused spray jet printing system which quickly switches or controls the printing on-off of the atomization droplets which are continuously generated while maintaining a constant pressure.

In order to achieve the objects as described above, according to an aspect of the present invention, a focused spray jet printing system includes an atomization unit which atomizes ink by a carrier gas to make generate atomization droplets; a head unit including a virtual impactor which uniformizes sizes of supply atomization droplets ejected from the atomization unit to eject uniform atomization droplets; a focusing unit which is provided in the head unit to focus the uniform atomization droplets introduced into the head unit with sheath gas to spray the uniform atomization droplets onto a substrate; a sheath gas mass flow controller (sheath MFC) which supplies the sheath gas; and a valve unit which is selectively connected to any one of an atomization droplet flow path which is formed in the head unit to flow the uniform atomization droplets to connect the virtual impactor and the focusing unit and a flow path formed at the outside of the head unit to flow the sheath gas.

The sheath MFC may supply a flow rate more than a flow rate of the sheath gas used to focus the uniform atomization droplets in the case of printing-on in which the uniform atomization droplets are sprayed from a nozzle formed on a lower end of the focusing unit.

A flow rate of the discharged fluid sprayed from the nozzle in the case of printing-on in which the uniform atomization droplets are sprayed from the nozzle is equal to a flow rate of the discharged fluid sprayed from the nozzle in the case of printing-off in which the uniform atomization droplets are not sprayed, but only the sheath gas is sprayed from the nozzle.

In the case of printing-on, the discharged fluid may include both the uniform atomization droplets and the sheath gas and in the case of printing-off, the discharged fluid may include only the sheath gas with the same flow rate as that in the case of printing-on.

A vent flow path which is connected to the atomization droplet flow path and the valve unit is formed in the head unit and in the case of printing-off, a vent mass flow controller (vent MFC) which is connected to the vent flow path by the valve unit to vent the uniform atomization droplets and a part of the sheath gas to the outside may be included.

A set flow rate of the vent MFC is more than a flow rate of the uniform atomization droplets supplied from the atomization unit so that in the case of printing-off, a part of the sheath gas introduced into the focusing unit passes through the vent flow path and the valve unit together with the uniform atomization droplets to be vented to the outside by the vent MFC.

The sheath MFC may be connected to a first branched flow path which supplies the sheath gas to the focusing unit and a second branched flow path which vents the sheath gas to the outside by the vent MFC.

In the case of printing-on, the valve unit connects the second branched flow path and the vent MFC to vent sheath gas which is additionally supplied other than sheath gas used to focus the uniform atomization droplets to the outside through the second branched flow path and blocks the vent flow path connected to the atomization droplet flow path which flows the uniform atomization droplets through the focusing unit to spray the uniform atomization droplets to be focused by the sheath gas introduced into the focusing unit from the nozzle.

The valve unit connects the vent MFC and the sheath MFC in the case of printing-on to vent a part of the sheath gas supplied from the sheath MFC or connects the vent MFC and the vent flow path in the case of printing-off to backwardly flow all the uniform atomization droplets supplied to the focusing unit from the virtual impactor and a part of the sheath gas supplied to the focusing unit through the atomization droplet flow path to be vented to the outside to block the uniform atomization droplets from being sprayed from the nozzle.

In the case of printing-on in which the valve unit connects the sheath MFC and the vent MFC, an excessive flow rate of sheath gas which is not used to focus the uniform atomization droplets, among sheath gas ejected from the sheath MFC, is vented by the vent MFC and only the sheath gas used to focus the uniform atomization droplets is supplied to the focusing unit to be sprayed from the nozzle together with the focused uniform atomization droplets and a flow rate of the discharged fluid sprayed from the nozzle is the sum of flow rates of the sheath gas and the uniform atomization droplets which are sprayed from the nozzle.

In the case of printing-off in which the valve unit connects the vent MFC and the vent flow path, the remaining sheath gas which does not backwardly flow through the atomization droplet flow path, among the sheath gas supplied to the focusing unit, is sprayed from the nozzle and a flow rate of the sheath gas sprayed from the nozzle is equal to a flow rate of the discharged gas sprayed from the nozzle in the case of printing-on.

A set flow rate of the vent MFC is less than a flow rate of the sheath gas supplied by the sheath MFC and is more than a flow rate of the uniform atomization droplets supplied to the focusing unit.

According to the exemplary embodiment of the present invention, the focused spray jet printing system may obtain a stable and high-quality printing characteristic as compared with the outer shuttering method of the related art and may simplify the structure and minimize the internal pressure variation as compared with the inner shuttering method of the related art to improve the printing quality.

According to the exemplary embodiment of the present invention, the focused spray jet printing system may control the spraying on-off of the uniform atomization droplets by controlling a flow rate of the sheath gas or the change of flowing direction, and vent inside while constantly maintaining a pressure applied to the nozzle.

According to the exemplary embodiment of the present invention, the focused spray jet printing system improves the spraying on-off characteristic of the uniform atomization droplets of a system which provides a direct printing method of functional liquid (conductive, insulating, or the like) and minimizes the pressure change while spray on-off switching (shuttering) of the uniform atomization droplets to allow the discharging with the uniform line with over the entire printing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

Hereinafter, exemplary embodiments of the present invention will be described in detail with reference to the accompanying drawings.

Figure 1:
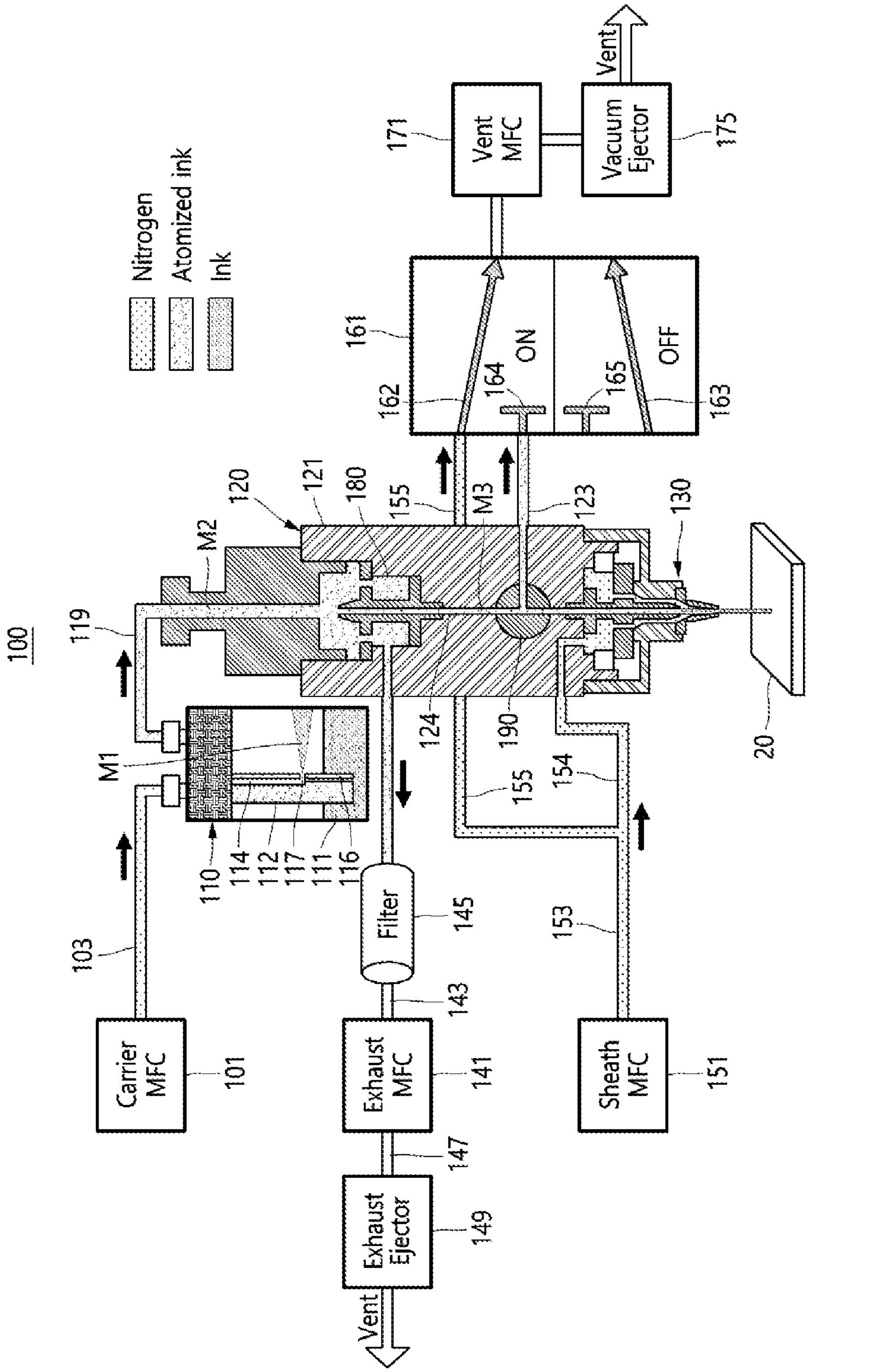
FIG. 1 is a view illustrating a state of a valve unit through which uniform atomization droplets are sprayed in a focused spray jet printing system according to an exemplary embodiment of the present invention.
Figure 2:
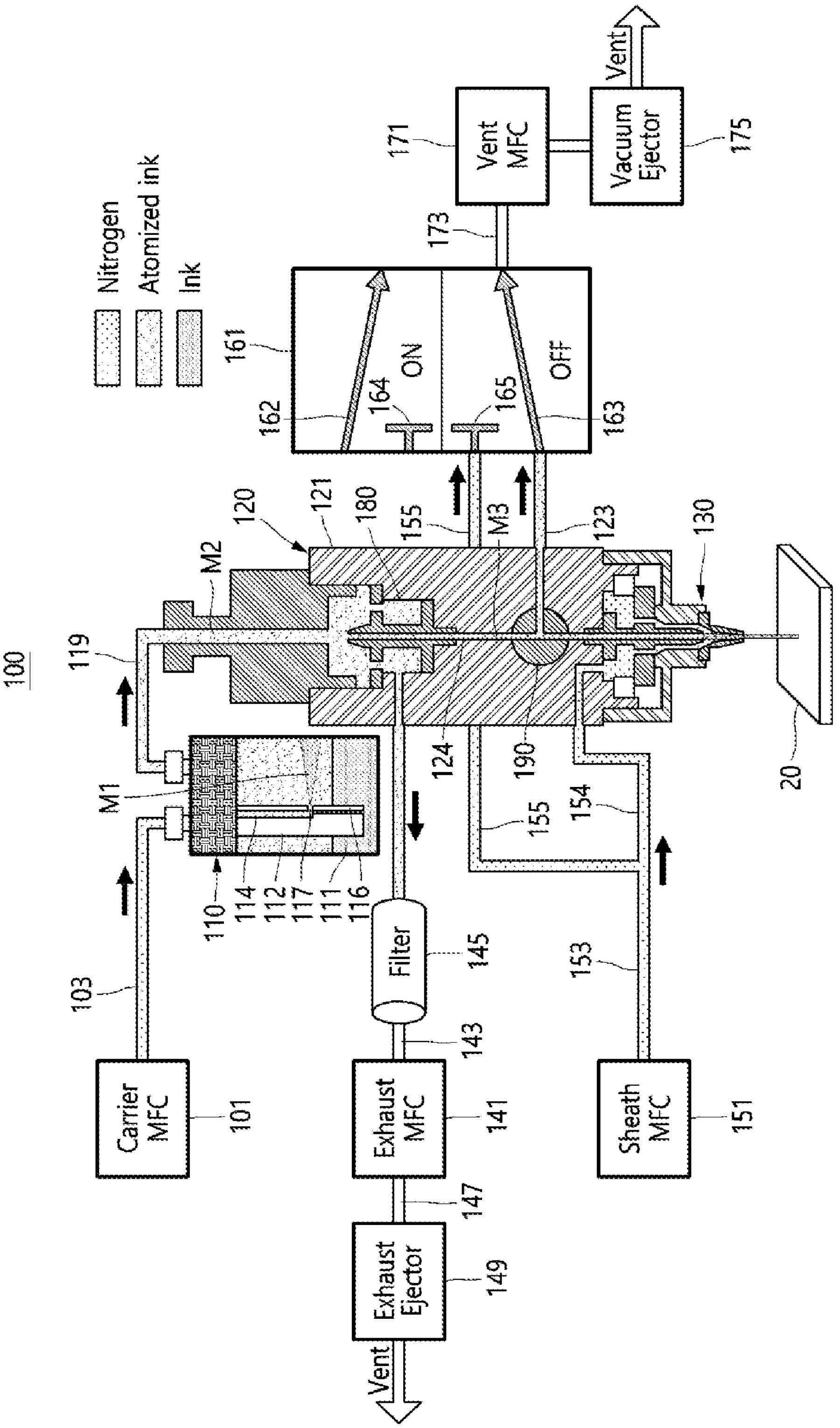
FIG. 2 is a view illustrating a state of a valve unit through which uniform atomization droplets are not sprayed in a focused spray jet printing system according to an exemplary embodiment of the present invention.
Figure 3A:
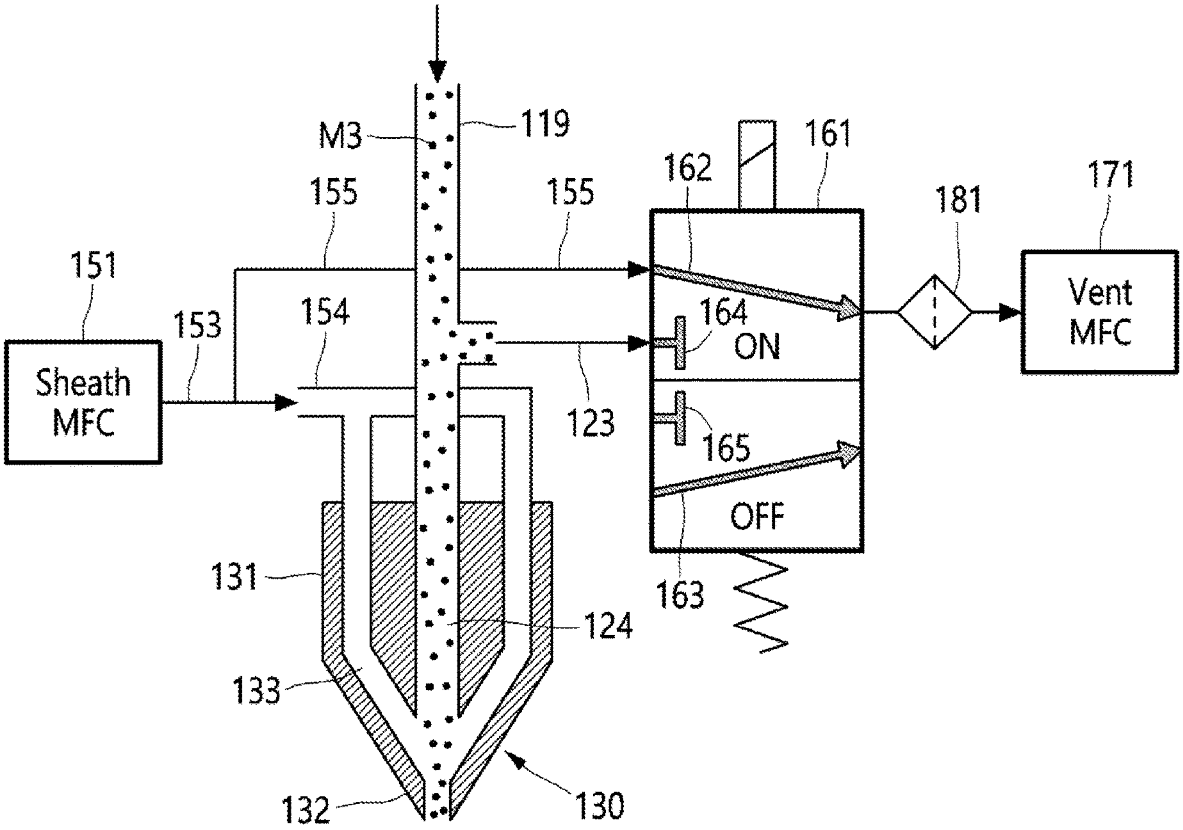
FIG. 3A is a view of a flow path connection state of a sheath gas mass flow controller, a focusing unit, a valve unit, and a vent mass flow controller of a system of FIG. 1.
Figure 3B:
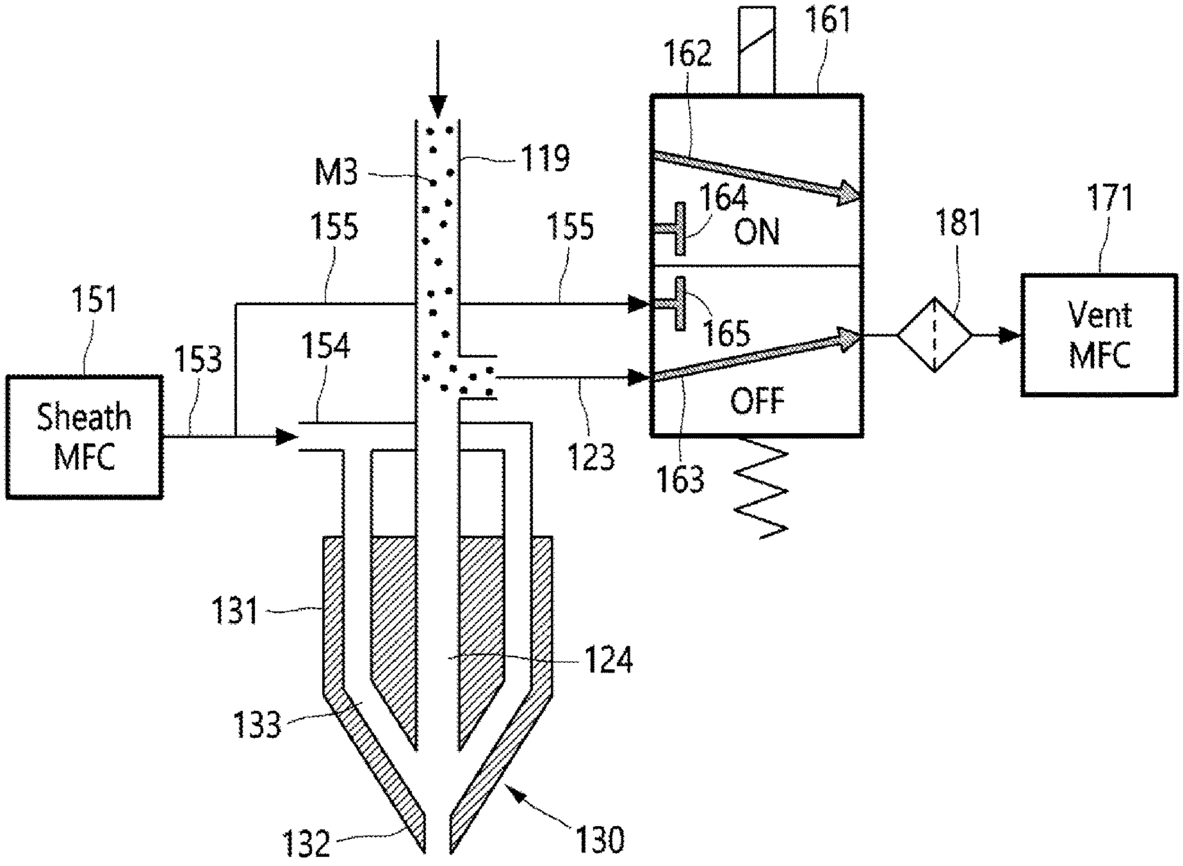
FIG. 3B is a view of a flow path connection state of a sheath gas mass flow controller, a focusing unit, a valve unit, and a vent mass flow controller of a system of FIG. 2.

FIG. 1 is a view illustrating a state of a valve unit through which uniform atomization droplets are sprayed in a focused spray jet printing system according to an exemplary embodiment of the present invention, FIG. 2 is a view illustrating a state of a valve unit through which uniform atomization droplets are not sprayed in a focused spray jet printing system according to an exemplary embodiment of the present invention, FIG. 3A is a view of a flow path connection state of a sheath gas mass flow controller, a focusing unit, a valve unit, and a vent mass flow controller of a system of FIG. 1, FIG. 3B is a view of a flow path connection state of a sheath gas mass flow controller, a focusing unit, a valve unit, and a vent mass flow controller of a system of FIG. 2, and FIGS. 4A to 5B are views for explaining operations of a sheath gas mass flow controller, a focusing unit, a valve unit, and a vent mass flow controller of a system of FIGS. 3A and 3B, and FIGS. 6A and 6B are views illustrating whether a pressure is changed when spraying of uniform atomization droplets is on or off in a focused spray jet printing system according to an exemplary embodiment of the present invention and the related art.

Referring to FIGS. 1 and 2, a focused spray jet printing system 100 (hereinafter, referred to as "system") according to an exemplary embodiment of the present invention may include an atomization unit 110 which atomizes ink by a carrier gas (nitrogen) to make generate atomization droplets M1, a head unit 120 which includes a virtual impactor 180 which uniformizes sizes of supply atomization droplets M2 ejected from the atomization unit 110 to eject uniform atomization droplets M3, a focusing unit 130 which is provided in the head unit 120 to focus the uniform atomization droplets M3 introduced into the head unit 120 with a sheath gas to spray the droplets onto a substrate 20, a sheath gas mass flow controller (sheath gas MFC) 151 which supplies the sheath gas, and a valve unit 161 which is selectively connected to any one of an atomization droplet flow path 124 which is formed in the head unit 120 to flow the uniform atomization droplets M3 to connect the virtual impactor 180 and the focusing unit 130 and a flow path 155 formed at the outside of the head unit 120 to flow the sheath gas.

Here, in the case of printing-on in which the uniform atomization droplets M3 are sprayed from the nozzle 131 formed on a lower end of the focusing unit 130, the sheath MFC 151 may supply sheath gas at a flow rate more than a flow rate of the sheath gas used to focus the atomization droplets M3.

The sheath MFC 151 may control to supply sheath gas at a flow rate more than a flow rate of a sum of the uniform atomization droplets M3 sprayed from the nozzle 131 of the focusing unit 130 and the sheath gas in the case of printing-on in which the uniform atomization droplets M3 are sprayed and may control to supply sheath gas at a flow rate more than a flow rate of the sheath gas sprayed from the nozzle 131 of the focusing unit 130 in the case of printing-on, in the case of printing-off in which the uniform atomization droplets M3 are not sprayed from the nozzle 131.

The sheath MFC 151 of the system 100 according to the exemplary embodiment of the present invention supplies the sheath gas at a flow rate more than a flow rate of the uniform atomization droplets M3 sprayed from the nozzle 131 in the case of printing-on and a flow rate of the sheath gas sprayed to focus the uniform atomization droplets M3 from the nozzle 131 after focusing the uniform atomization droplets M3.

A sheath gas which is not used to focus the uniform atomization droplets M3, among the sheath gas discharged from the sheath MFC 151, is directly connected to the vent MFC 171 to be vented to the outside so that only a predetermined amount of sheath gas is used to focus the uniform atomization droplets M3.

Further, in the case of printing-off in which the uniform atomization droplets M3 are not sprayed from the nozzle 131, a part of the sheath gas backwardly flows from the focusing unit 130 to be vented to the outside along the atomization droplet flow path 124 together with the uniform atomization droplets M3 to turn off the printing.

Hereinafter, "discharged fluid" refers to fluid (gas) which is sprayed toward the substrate 20 from the nozzle 131 of the focusing unit 130. The discharged fluid refers to a fluid which is discharged toward the substrate 20 from the nozzle 131, regardless of the printing-on in which the uniform atomization droplets M3 are sprayed and the printing-off in which the uniform atomization droplets M3 are not sprayed. Therefore, in the case of printing-on in which the uniform atomization droplets M3 are sprayed, the discharged fluid includes both the uniform atomization droplets M3 and a sheath gas which focuses the uniform atomization droplets M3 and in the case of printing-off in which the uniform atomization droplets M3 are not sprayed, the discharged fluid includes only the sheath gas.

Further, hereinafter, "focused spray jet" refers to a discharged fluid including both the uniform atomization droplets M3 and the sheath gas which focuses the uniform atomization droplets M3 in the case of printing-on in which the uniform atomization droplets M3 are sprayed from the nozzle 131.

Referring to FIGS. 1 and 2, an atomization unit 110 of the system 100 according to the exemplary embodiment of the present invention may include an atomizer 112 provided such that one end is immersed in ink 111 in a container-shaped chamber (not illustrated) and a carrier gas flow path 114 which is formed in the atomizer 112 to supply carrier gas to the ink 111. An ink suction flow path 116 may be formed at one end of the atomization nozzle 112 which is provided to be immersed in the ink 111.

The atomizer 112 of the atomization unit 110 may include a carrier gas flow path 114, an ink suction flow path 116, and an orifice 117 which creates generate atomization droplets M1.

A carrier gas mass flow controller (carrier MFC) 101 which supplies carrier gas to the chamber may be provided at one side of the atomization unit 110. The atomization unit 110 and the carrier MFC 101 may be connected by the carrier gas flow path 103. The carrier gas may be supplied from the carrier MFC 101 to the atomization unit 110 through the carrier gas flow path 103.

The atomizer 112 may be supplied with the carrier gas into the chamber of the atomization unit 110 through the carrier gas flow path 114. The atomizer 112 may create the generate atomization droplets M18 in the mist state by sucking ink through the ink suction flow path 116 by a negative pressure caused by the movement of carrier gas supplied through the carrier gas flow path 114 and then discharging the ink through the orifice 117. The generate atomization droplets M1 are present in the chamber in the mist state.

The supply atomization droplets M2 discharged from the atomization unit 110 may be supplied to the virtual impactor 180 provided in the head unit 120 through the atomization droplet supply flow path 119. Here, the supply atomization droplets M2 refer to atomization droplets which are ejected from the atomization unit 110 to be introduced into the virtual impactor 180 through the atomization droplet supply flow path 119 and is present in the mist state.

The virtual impactor 180 may discharge droplets having smaller particle sizes, among supply atomization droplets M2 introduced through the atomization droplet supply flow path 119, through the exhaust flow path 143 and supply only uniform atomization droplets M3 having larger particle sizes to the focusing unit 130. At this time, in order to exhaust the atomization droplets having smaller size, the exhaust mass flow controller (exhaust MFC) 141 may be used, without using a pressure difference.

For better understanding, atomization droplets which are discharged from the virtual impactor 180 after going through the particle uniformization process in the virtual impactor 180 and then introduced into the focusing unit 130 are referred to as uniform atomization droplets M3. The uniform atomization droplets M3 are introduced into the focusing unit 130 in the mist state.

Referring to FIGS. 1 and 2, an arrow exiting the exhaust ejector 149 connected to the exhaust MFC 141 is denoted by "vent" and it means "exhaust". In other words, "vent" denoted on one arrow of the exhaust ejector 149 means that in order to introduce uniform atomization droplets M3 with uniform size to the focusing unit 130, atomization droplets having smaller particle sizes, among supply atomization droplets M2, are discharged to the outside through the exhaust MFC 141 by the virtual impactor 180.

An exhaust inlet flow path 143 may be connected to an inlet of the exhaust MFC 141 and an exhaust outlet flow path 147 may be connected to an outlet.

In the meantime, in order to make a sufficient flow rate, the exhaust outlet flow path 147 may be configured by a weak vacuum negative pressure. For example, the exhaust ejector 149 is installed in the exhaust outlet flow path 147 connected to the outlet of the exhaust MFC 141 to apply a weak vacuum negative pressure to the exhaust outlet flow path 147.

A filter 145 may be provided in the exhaust inlet flow path 143. A pressure applied to the exhaust outlet flow path 147 is slightly lower than an internal pressure of the head unit 120. This is because the pressure drop is caused by the filter 145 so that a weak vacuum negative pressure is applied to the exhaust outlet flow path 147.

The virtual impactor 180 may be formed in the head unit 120. The head unit 120 may include a body part 121 and the virtual impactor 180 may be formed in the body part 121.

A plurality of flow paths may be formed or connected to the body part 121 and the focusing unit 130 may be provided at the lower end of the body part 121. In the body part 121, sheath gas flow paths 154 and 155, a atomization droplet flow path 124, and a vent flow path 123 may be formed. Further, a supplementary unit 190 may be formed at the intersection of the atomization droplet flow path 124 and the vent flow path 123. Here, the supplementary unit 190 may be formed separately from the body part 121 or may be integrally formed with the body part 121.

The vent flow path 123 may be provided in the head unit 120 to be located between the virtual impactor 180 and the focusing unit 130. The vent flow path 123 is connected or is not connected to a valve unit 161 to be described below so that the uniform atomization droplets M3 are sprayed or are not sprayed from the nozzle 131.

As described above, the system 100 according to the exemplary embodiment of the present invention may include a focusing unit 130 which focuses the uniform atomization droplets M3 introduced into the focusing unit 130 with the sheath gas to spray the sheath gas and the uniform atomization droplets M3 together on a surface of the substrate 20 to perform printing and a sheath MFC 151 which supplies the sheath gas to the focusing unit 130. The sheath gas may include nitrogen.

The sheath MFC 151 is connected to sheath gas flow paths 153, 154, and 155 to supply sheath gas. The sheath gas flow paths 153, 154, and 155 may include a main flow path 153 and a first branched flow path 154 and a second branched flow path 155 which are branched from the main flow path 153. The first branched flow path 154 may be connected to the focusing unit 130 and the second branched flow path 155 may be connected to the valve unit 161 and the valve unit 161 may be connected to the vent MFC 171.

In some cases, the main flow path 153 is omitted and the first and second branched flow paths 154 and 155 may be directly connected to the sheath MFC 151.

The second branched flow path 155 is provided at the outside of the body part 121 so as not to intersect the atomization droplet flow path 124 to be connected to the valve unit 161.

In FIG. 1, the sheath gas which flows through the first branched flow path 154 is supplied to the focusing unit 130 to focus the uniform atomization droplets M3 and is sprayed toward the substrate 20 together with the uniform atomization droplets M3, but the sheath gas which flows through the second branched flow path 155 is not supplied to the focusing unit 130, but is vented via the vent MFC 171 through the valve unit 161.

In the meantime, referring to FIGS. 1 and 2, an arrow exiting the vacuum ejector 175 connected to the vent MFC 171 is denoted by "vent" and it means "vent" to eject fluid (gas) to the outside. That is, in the specification below, "vent" means that the uniform atomization droplets M3 are ejected to the outside through the vent MFC 171, rather than the nozzle 131, or a part of sheath gas is ejected to the outside through the vent MFC 171 during the printing on-off switching (shuttering) using the valve unit 161. In other words, in the specification, "vent" denoted on the arrow in the exiting direction from the vacuum ejector 175 connected to the vent MFC 171 has a different meaning from "vent" denoted on the arrow in the exiting direction from the exhaust ejector 149 connected to the exhaust MFC 141.

As illustrated in FIG. 1, in the case of printing-on in which the uniform atomization droplets M3 pass through the focusing unit 130 and then are sprayed together with the sheath gas, the sheath MFC 151 of the system 100 according to the exemplary embodiment of the present invention may control to supply the sheath gas through the main flow path 153 at a flow rate more than a sum of a flow rate of the uniform atomization droplets M3 sprayed from the nozzle 131 (see FIGS. 3A and 3B) and a flow rate of sheath gas which is used for the focusing unit 130 to focus the uniform atomization droplets M3.

The sheath MFC 151 sets a sheath gas flow rate supplied through the main flow path 153 to be slightly more than a flow rate of the sheath gas used to focus the uniform atomization droplets M3 in the focusing unit 130 during the printing-on. In the case of the printing-on in which the uniform atomization droplets M3 are sprayed from the nozzle 131, if a flow rate of the sheath gas required for the focusing unit 130 to focus the uniform atomization droplets M3 is 50 sccm, the sheath gas flow rate is set to supply the sheath gas through the main flow path 153 at a flow rate more than a sum (60 sccm) of a flow rate of 10 sccm of the uniform atomization droplets M3 sprayed from the nozzle 131 and a flow rate of 50 sccm of the sheath gas used for focusing. For example, in the case of the printing-on, if a flow rate of the sheath gas required for the focusing unit 130 to focus the uniform atomization droplets M3 is 50 sccm and a flow rate of the uniform atomization droplets M3 which is sprayed through the nozzle 131 is 10 sccm, the sheath MFC 151 controls the flow rate of the sheath gas to be 70 sccm by adding 20 sccm to an amount required for focusing to supply the sheath gas through the main flow path 153 more than the flow rate of the uniform atomization droplets M3.

In the meantime, a flow rate of the discharged fluid which is sprayed from the nozzle 131 of the focusing unit 130 of the system 100 according to the exemplary embodiment of the present invention toward the substrate 20 may simultaneously include both the flow rate of the uniform atomization droplets M3 and the flow rate of the sheath gas (in FIG. 1) or include only the flow rate of the sheath gas (in FIG. 2).

As illustrated in FIG. 1, when flow rates of the uniform atomization droplets M3 and the sheath gas for focusing are included in the flow rate of the discharged fluid, the system 100 sprays a focused spray jet including the uniform atomization droplets M3 so that the printing is performed (printing-on). However, as illustrated in FIG. 2, when only the flow rate of the sheath gas is included in the flow rate of the discharged fluid, the system 100 does not spray the uniform atomization droplets M3 so that the printing is not performed (printing-off). That is, in the focused spray jet in which both the flow rates of the uniform atomization droplets M3 and the sheath gas are included in the flow rate of the discharged fluid, the printing function is on, but when only the flow rate of the sheath gas is included in the flow rate of the discharged fluid, the printing function is off.

As illustrated in FIG. 1, during the printing-on, the sheath gas which is not included in the discharged fluid sprayed from the nozzle 131 is directly vented to the outside through the vent MFC 171 after passing through the valve unit 161 through the second branched flow path 155 and only the sheath gas at a remaining predetermined flow rate is supplied to the focusing unit 130 through the first branched flow path 154 to be used to focus the uniform atomization droplets M3.

As illustrated in FIG. 2, during the printing-off, all the sheath gas supplied from the sheath MFC 151 is supplied to the focusing unit 130 through the first branched flow path 154 and then passes through the valve unit 161 together with the uniform atomization droplets M3 along the atomization droplet flow path 124 and then is vented to the outside through the vent MFC 171 to be used to turn off the printing.

In FIGS. 1 to 5B, ON and OFF denoted on the valve unit 161 refer to spraying on-off of the uniform atomization droplets M3 of the system 100 or printing function on-off.

In the meantime, the system 100 according to the exemplary embodiment of the present invention may include a valve unit 161 which is provided between the head unit 120 and the vent MFC 171 to be connected to any one of the second branched flow path 155 and the vent flow path 123. Further, the system may include a vent MFC 171 which is connected to the valve unit 161 to vent the uniform atomization droplets M3 or the sheath gas.

The valve unit 161 may connect any one of the vent flow path 123 and the second branched flow path 155 to the vent MFC 171.

The valve unit 161 may include an ON part and an OFF part. In the ON part of the valve unit 161, a first connection flow path 162 and a first shutoff flow path 164 may be formed and in the OFF part, a second connection flow path 163 and a second shutoff flow path 165 may be formed.

The vent MFC 171 may be connected to any one of the first connection flow path 162 or the second connection flow path 163 of the valve unit 161.

The system 100 according to the exemplary embodiment of the present invention may further include a vacuum ejector 175 which is connected to the vent MFC 171.

Referring to FIG. 1, the second branched flow path 155 and the vent MFC 171 are connected to both ends of the first connection flow path 162 of the valve unit 161. In this state, the sheath gas which flows through the second branched flow path 155 flows through the first connection flow path 162 of the valve unit 161 through the vent MFC 171 and then may be vented. At this time, a flow rate of the sheath gas which flows through the second branched flow path 155 may be determined by the vent MFC 171. The vent MFC 171 may vent a fluid with a predetermined constant flow rate.

As illustrated in FIG. 1, during the printing-on, the vent flow path 123 connected to the atomization droplet flow path 124 through which the uniform atomization droplets M3 ejected from the virtual impactor 180 to be introduced into the focusing unit 130 flows is connected to the first shutoff flow path 164 of the valve unit 161 to be blocked so that the uniform atomization droplets M3 which flows through the atomization droplet flow path 124 does not flow to the vent MFC 171, but flows through the focusing unit 130. In contrast, the second branched flow path 155 through which the sheath gas flows are connected to the first connection flow path 162 of the valve unit 161 so that a part of sheath gas which is not used to focus the uniform atomization droplets M3 is vented by the vent MFC 171. The sheath gas which flows through the first branched flow path 154 is used to focus the uniform atomization droplets M3 in the focusing unit 130 and is sprayed toward the substrate 20 from the nozzle 131 together with the uniform atomization droplets M3 so that the printing function of the system 100 is turned on.

As illustrated in FIG. 2, in the case of printing-off, the vent flow path 123 and the main vent flow path 173 may be connected to both ends of the second connection flow path 163 of the valve unit 161. The main vent flow path 173 is connected to the vent MFC 171. In this state, all the uniform atomization droplets M3 which flows through the atomization droplet flow path 124 flows through the vent flow path 123 and the second connection flow path 163 by the vent MFC 171 and then may be vented to the outside. At this time, the flow rate of the uniform atomization droplets M3 which flow through the vent flow path 123 may be determined by a set flow rate of the vent MFC 171.

In contrast, the second branched flow path 155 through which the sheath gas supplied by the sheath MFC 151 flows is connected to the second shutoff flow path 165 of the valve unit 161 to be blocked so that the sheath gas does not flow through the second branched flow path 155. Accordingly, all the sheath gas supplied by the sheath MFC 151 is supplied to the focusing unit 130. There is no uniform atomization droplet M3 introducing into the focusing unit 130 so that the printing-off (OFF) state in which only the sheath gas is sprayed from the nozzle 131 toward the substrate 20 is formed.

In the meantime, in FIG. 2, a flow rate vented through the vent flow path 123 is determined by the set flow rate of the vent MFC 171. In this case, the set flow rate of the vent MFC 171 is larger than a flow rate of the uniform atomization droplets M3 vented to the outside through the vent flow path 123. Accordingly, a part of the sheath gas introduced into the focusing unit 130 through the first branched flow path 154 flows backwardly from a lower portion to an upper portion of the atomization droplet flow path 124 and then flows through the vent flow path 123 and the second connection flow path 163 together with the uniform atomization droplets M3, and then is vented to the outside by the vent MFC 171. That is, in the state illustrated in FIG. 2, the vent MFC 171 may vent all the uniform atomization droplets M3 and a part of the sheath gas.

As described above, a remaining flow rate excluding a flow rate vented through the vent flow path 123, among the sheath gas introduced into the focusing unit 130 through the first branched flow path 154, is sprayed through the nozzle 131 and makes the printing-off state.

As described above, the valve unit 161 of the system 100 according to the exemplary embodiment of the present invention connects any one of the vent flow path 123 and the second branched flow path 155 to the vent MFC 171 to vent only the sheath gas or simultaneously vent both the sheath gas and the uniform atomization droplets M3 to switch (shutter) the printing on and off.

The valve unit 161 includes a solenoid valve to be provided in a valve driving manner.

The valve unit 161 is provided to change a connection state with the vent flow path 123 provided between the virtual impactor 180 and the focusing unit 130. In the case of printing-on, the valve unit 161 is not connected to the vent flow path 123 but is directly connected to the sheath MFC 151 or the second branched flow path 155.

In the case of printing-off, the valve unit 161 is connected to the vent flow path 123 so that all the sheath gas is applied to the focusing unit 130 through the first branched flow path 154. At this time, the uniform atomization droplets M3 and a part of the sheath gas are vented to the outside via the vent MFC 171 through the valve unit 161 connected to the vent flow path 123 to turn off the printing function. At this time, only the remaining sheath gas is sprayed through the nozzle 131 so that the uniform atomization droplets M3 may be perfectly prevented from being applied to the nozzle 131.

In FIGS. 3A and 3B, views for explaining a connection relationship of a sheath MFC 151, a focusing unit 130, a valve unit 161, and a vent MFC 171 is illustrated. FIG. 3A is a view of an example of FIG. 1 and FIG. 3B is a view of an example of FIG. 2.

In the focusing unit 130, a nozzle 131 which sprays a discharged fluid including the sheath gas and the uniform atomization droplets M3 (in the case of printing-on) or a discharged fluid including only the sheath gas (in the case of printing-off) may be provided. The focusing unit 130 may include a nozzle 131, an atomization droplet flow path 124 provided in the nozzle 131 to be connected to the atomization droplet supply flow path 119 and a sheath gas spraying flow path 133 provided in the nozzle 131 to be located around the atomization droplet flow path 124. The uniform atomization droplets M3 or the sheath gas which passes through the atomization droplet flow path 124 and the sheath gas spraying flow path 133 may be sprayed through a nozzle tip 132 provided at an end of the nozzle 131.

As described above, in the case of printing-on, the uniform atomization droplets M3 and the sheath gas for focusing may be sprayed from the nozzle 131 together and in the case of printing-off, only the sheath gas may be sprayed from the nozzle 131.

In the meantime, a vacuum generator 181 may be provided between the valve unit 161 and the vent MFC 171. As described above, the vacuum generator 181 is provided at a rear end of the vent MFC 171 to make the pressure lower than an atmospheric pressure.

As illustrated in FIG. 3A, the valve unit 161 may connect the second branched flow path 155 and the vent MFC 171 to vent a part of the sheath gas which is supplied by the sheath MFC 151 to the outside. At this time, the system 100 is in the printing-on state in which the uniform atomization droplets M3 are sprayed from the nozzle 131 together with the sheath gas.

As illustrated in FIG. 3B, the valve unit 161 may connect the vent MFC 171 and the vent flow path 123 so that all the uniform atomization droplets M3 introduced from the atomization unit 110 to the focusing unit 130 and a part of the sheath gas which is supplied from the sheath MFC 151 to be introduced into the focusing unit 130 through the first branched flow path 154 backwardly flow through the atomization droplet flow path 124 to be vented to the outside. At this time, the system 100 is in the printing-off state in which only the sheath gas is sprayed from the nozzle 131.

A flow rate vented to the outside by the vent MFC 171, that is, a set flow rate of the vent MFC 171 is desirably lower than a flow rate of the sheath gas which flows through the main flow path 153 by the sheath MFC 151 and is desirably higher than a flow rate of the uniform atomization droplets M3 which flows through the atomization droplet supply flow path 119.

Hereinafter, a flow rate flowing through a flow path when a printing function of a system 100 according to an exemplary embodiment of the present invention is on or off will be described with reference to FIGS. 4A to 5B.

Figure 4A:
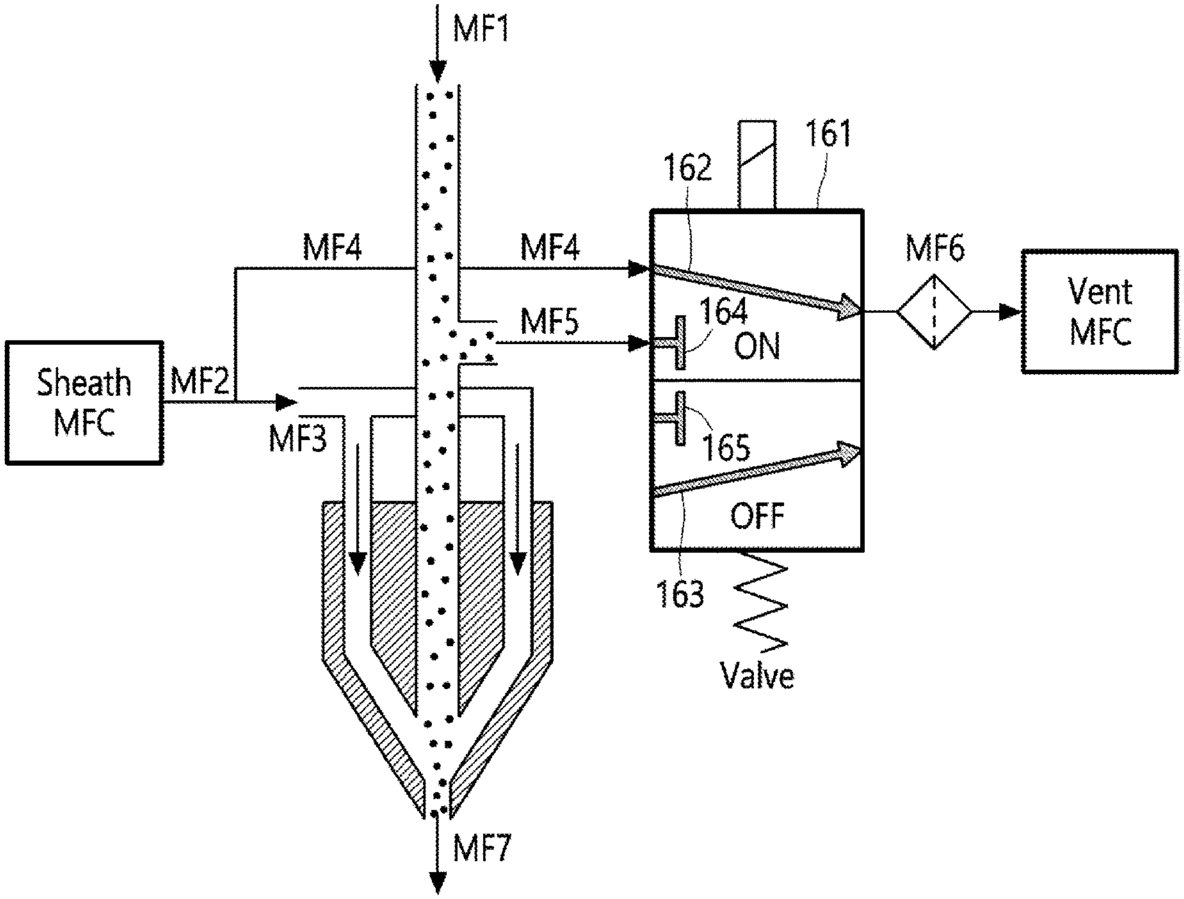
FIGS. 4A to 5B are views for explaining operations of a sheath gas mass flow controller, a focusing unit, a valve unit, and a vent mass flow controller of a system of FIGS. 3A and 3B.
Figure 4B:
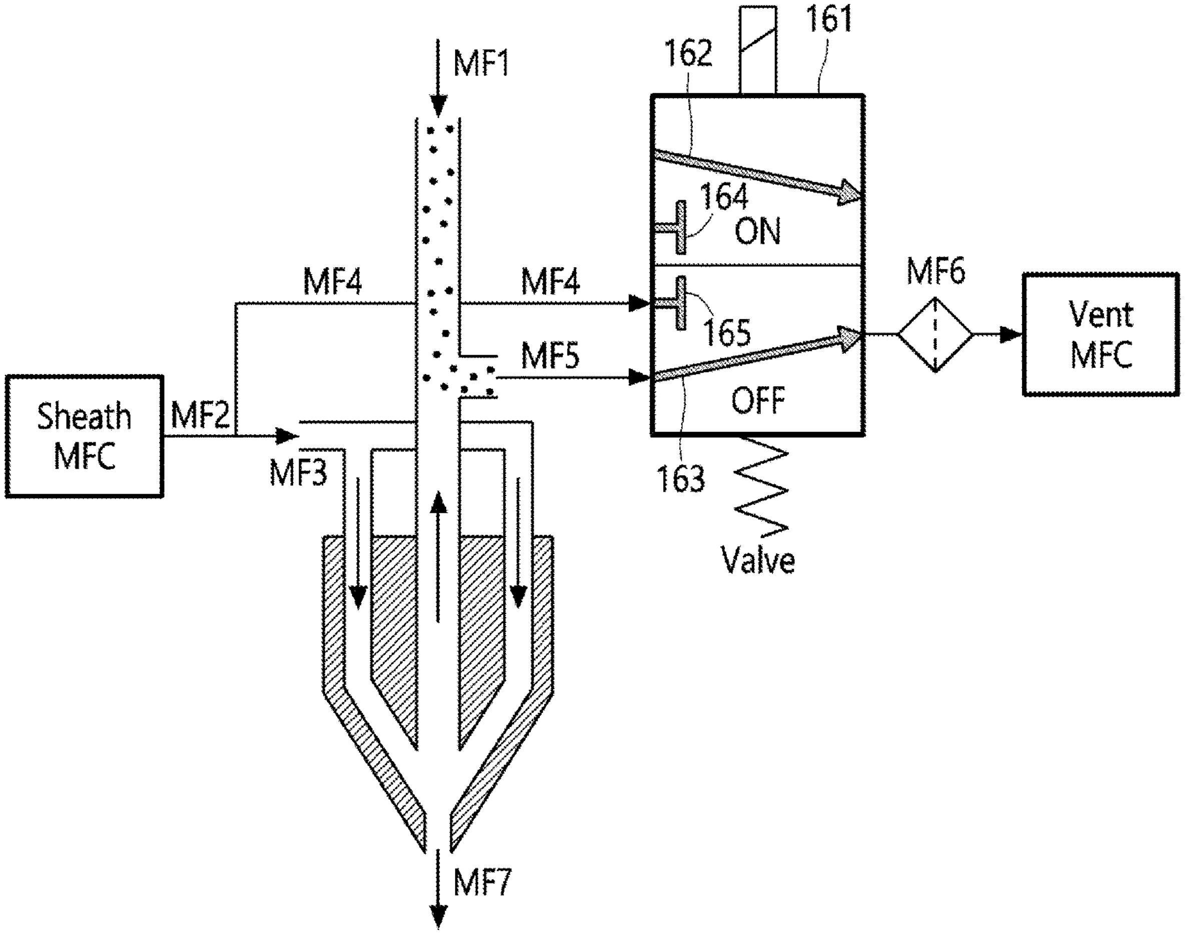
Figure 5A:
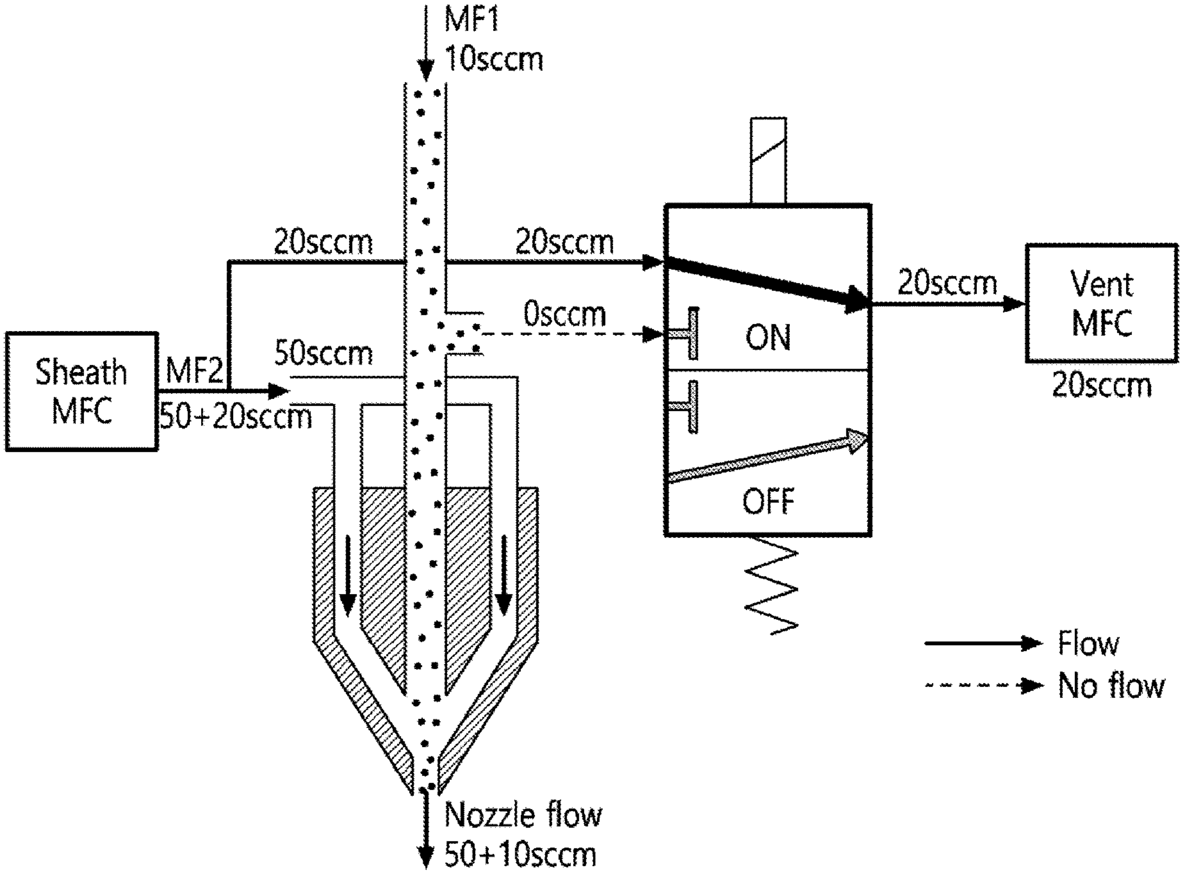
Figure 5B:
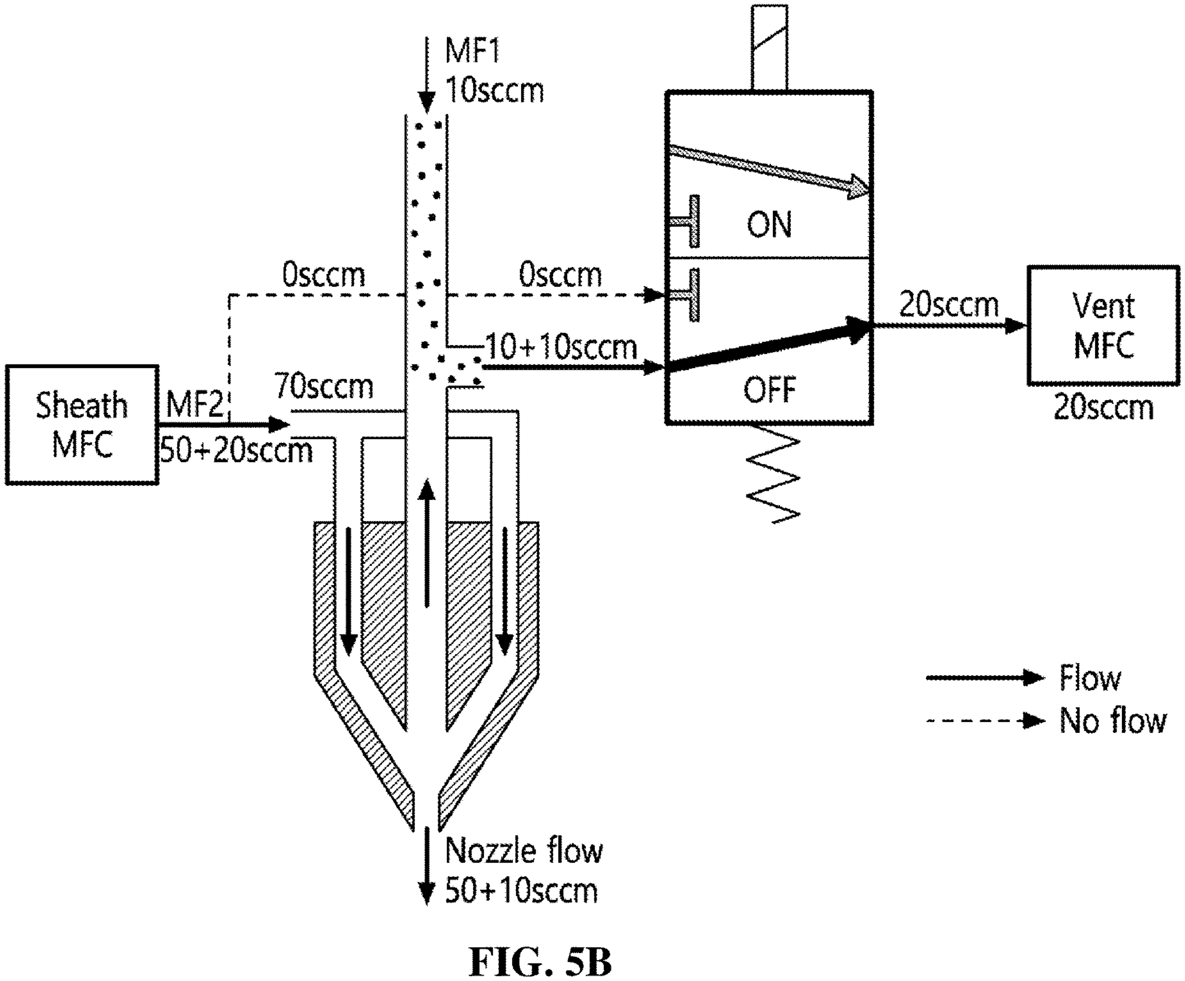

FIGS. 4A and 5A illustrate a printing function-on state of the system 100 and FIGS. 4B and 5B illustrate a printing function-off state of the system 100.

First, in FIGS. 4A and 4B, MF1 refers to a flow rate of uniform atomization droplets M3 which pass through the virtual impactor 180 and then flow through the atomization droplet flow path 124, MF2 refers to a flow rate of a sheath gas which is supplied from the sheath MFC 151 to flow through the main flow path 153, MF3 refers to a flow rate of a sheath gas flowing through the first branched flow path 154, MF4 refers to a flow rate of a sheath gas flowing through the second branched flow path 155, MF5 refers to a flow rate of a fluid flowing through the vent flow path 123, MF6 refers to a flow rate of fluid vented by a set flow rate of the vent MFC 171, and MF7 refers to a flow rate of discharged fluid sprayed from the nozzle 131.

Referring to FIG. 4A, when the valve unit 161 connects the second branched flow path 155 and the vent MFC 171, a partial flow rate MF4 of the overall flow rate MF2 of the sheath gas supplied by the sheath MFC 151 flows through the second branched flow path 155 and the first connection flow path 162 of the valve unit 161 and then is vented to the outside by the vent MFC 171. At this time, the flow rate MF4 of the sheath gas which flows through the second branched flow path 155 is equal to the set flow rate MF6 of the vent MFC 171. That is, the sheath gas of the same flow rate MF4 as the set flow rate MF6 of the vent MFC 171 is vented.

In contrast, all the sheath gas which flows through the first branched flow path 154 is introduced into the focusing unit 130 to be used to focus the uniform atomization droplets M3 and then is sprayed from the nozzle 131 together with the uniform atomization droplets M3. The flow rate M7 of the discharged fluid sprayed from the nozzle 131 is equal to the same as the sum of the flow rate MF3 of the sheath gas which flows through the first branched flow path 154 and the entire flow rate MF1 of the uniform atomization droplets M3 (MF1+MF3=MF7).

For example, referring to the case of the printing-on illustrated in FIG. 5A, when the flow rate MF1 of the uniform atomization droplets M3 which are ejected from the virtual impactor 180 to flow through the atomization droplet flow path 124 is 10 sccm (standard cc per minute), the flow rate MF2 of the sheath gas which is supplied from the sheath MFC 151 to flow through the main flow path 153 is 70 sccm, and the set flow rate MF6 of the vent MFC 171 is 20 sccm, the vent MFC 171 and the second branched flow path 155 are connected by the valve unit 161 so that the flow rate MF4 of 20 sccm of the sheath gas which flows through the second branched flow path 155 flows through the first connection flow path 162 of the valve unit 161 and then is vented to the outside through the vent MFC 171. The flow rate MF3 of 50 sccm of the sheath gas flowing through the first branched flow path 154 is introduced into the sheath gas spraying flow path 133 of the focusing unit 130 to be used to focus the uniform atomization droplets M3. Further, the overall flow rate MF1 of 10 sccm of the uniform atomization droplets M3 is introduced and flows into the atomization droplet flow path 124 of the focusing unit 130 without causing the loss. Accordingly, 50 sccm of sheath gas and 10 sccm of uniform atomization droplets M3 are sprayed from the nozzle 131. That is, the flow rate MF7 of the discharged fluid which is sprayed from the nozzle 131 is 60 sccm.

As described above, in the case of printing-on, the valve unit 161 connects the second branched flow path 155 and the vent MFC 171 to vent the sheath gas which is additionally supplied other than the sheath gas used to focus the uniform atomization droplets M3 to the outside through the second branched flow path 155 and blocks the vent flow path 123 connected to the atomization droplet flow path 124 which allows the uniform atomization droplets M3 to flow through the focusing unit 130 so that the uniform atomization droplets M3 is focused by the sheath gas introduced into the focusing unit 130 to be sprayed from the nozzle 131.

As illustrated in FIGS. 4A and 5A, in the case of printing-on, when the valve unit 161 connects the second branched flow path 155 and the vent MFC 171 and does not connect the vent flow path 123 and the vent MFC 171, the sheath gas MF3 which flows through the first branched flow path 154, of the sheath gas MF2 supplied from the sheath MFC 151, is introduced into the focusing unit 130 to be used to focus the uniform atomization droplets M3 and the sheath gas MF4 flowing through the second branched flow path 155 is not introduced into the focusing unit 130, but is vented to the outside through the valve unit 161 and the vent MFC 171 (MF4=MF6). Here, the flow rate MF4 of the sheath gas which is vented to the outside is equal to the set flow rate MF6 of the vent MFC 171.

Referring to the case of printing-off illustrated in FIG. 4B, when the valve unit 161 connects the vent flow path 123 and the vent MFC 171 and blocks the second branched flow path 155, the entire flow rate MF1 of the uniform atomization droplets M3 introduced into the atomization droplet flow path 124 is vented to the outside by the vent MFC 171 after flowing through the vent flow path 123 and the second connection flow path 163 of the valve unit 161. However, the set flow rate MF6 of the vent MFC 171 is larger than the entire flow rate MF1 of the vented uniform atomization droplets MF3 so that additional flow rate needs to be vented in addition to the entire flow rate of the uniform atomization droplets MF3.

In the meantime, the valve unit 161 blocks the second branched flow path 155 so that all the supplying flow rate MF2 of the sheath gas supplied by the sheath MFC 151 is introduced into the sheath gas spraying flow path 133 of the focusing unit 130 through the first branched flow path 154. However, the overall flow rate MF1 of the uniform atomization droplets MF3 is smaller than the set flow rate MF6 of the vent MFC 171 so that the flow rate (MF6-MF1) corresponding to the difference needs to be further vented. Accordingly, a partial flow rate MF5 of the flow rate MF3 of the sheath gas introduced into the sheath gas spraying flow path 133 backwardly flows through the atomization droplet flow path 124 to flow through the vent flow path 123 and the second connection flow path 163 of the valve unit 161 and then is vented to the outside together with the entire flow rate MF1 of the uniform atomization droplets MF3 by the vent MFC 171. At this time, the flow rate MF5 of the sheath gas which is vented by the vent MFC 171 is MF6-MF1.

In contrast, the remaining sheath gas of the sheath gas flowing through the sheath gas spraying flow path 133 is sprayed from the nozzle 131. At this time, the entire flow rate MF1 of the uniform atomization droplets M3 is vented to the outside through the vent flow path 123 so that there is no flow rate of the uniform atomization droplets M3 which are sprayed from the nozzle 131. Accordingly, the flow rate MF7 of the discharged fluid sprayed from the nozzle 131 is equal to the remaining flow rate (MF3-MF5) of the sheath gas.

For example, referring to the case of the printing-off illustrated in FIG. 5B, when the flow rate MF1 of the uniform atomization droplets M3 which are ejected from the virtual impactor 180 to flow through the atomization droplet flow path 124 is 10 sccm, the flow rate MF2 of the sheath gas which is supplied from the sheath MFC 151 is 70 sccm, and the set flow rate MF6 of the vent MFC 171 is 20 sccm, the vent MFC 171 and the vent flow path 123 are connected by the valve unit 161 so that the entire flow rate MF1 of 10 sccm of the uniform atomization droplets M3 flows through the vent flow path 123 and the second connection flow path 163 of the valve unit 161 and then is vented to the outside through the vent MFC 171. The set flow rate MF6 of 20 sccm of the vent MFC 171 is larger than the entire flow rate MF1 of 10 sccm of the uniform atomization droplets M3 so that all the uniform atomization droplets M3 are vented to the outside by the vent MFC 171.

In the meantime, the entire supplying flow rate MF2 of 70 sccm of the sheath gas flows through the sheath gas spraying flow path 133 of the focusing unit 130 through the first branched flow path 154 without being introduced into the second branched flow path 155. However, the entire flow rate MF1 of the uniform atomization droplets MF3 is 10 sccm larger than the set flow rate MF6 of the vent MFC 171 so that 10 sccm needs to be further vented. Accordingly, a flow rate MF5 of 10 sccm of the flow rate MF3 of 70 sccm of the sheath gas introduced into the sheath gas spraying flow path 133 backwardly flows through the atomization droplet flow path 124 to flow through the vent flow path 123 and the second connection flow path 163 of the valve unit 161 and then is vented to the outside together with the entire flow rate MF1 of the uniform atomization droplets MF3 by the vent MFC 171. Accordingly, the vent MFC 171 vents the entire flow rate MF1 of 10 sccm of the uniform atomization droplets M3 and a partial flow rate MF5 of 10 sccm of the sheath gas to the outside.

The remaining flow rate (MF3-MF5) of 60 sccm of the sheath gas which is introduced into the sheath gas spraying flow path 133 is sprayed from the nozzle 131. That is, the flow rate MF7 of the discharged fluid which is sprayed from the nozzle 131 is 60 sccm. At this time, only the sheath gas is sprayed from the nozzle 131 without the uniform atomization droplets M3 so that the printing-off state is formed.

As illustrated in FIGS. 4B and 5B, in the case of printing-off, when the valve unit 161 connects the vent MFC 171 and the vent flow path 123, the entire flow rate (MF2=MF3) of the sheath gas supplied from the sheath MFC 151 may be introduced into the focusing unit 130 or the nozzle 131.

However, a part MF5 of the sheath gas which is supplied to the focusing unit 130 by the sheath MFC 151 is vented by the vent MFC 171 and only the remaining sheath gas (MF3-MF5) is sprayed from the nozzle 131 and the flow rate MF7 of the discharged fluid sprayed from the nozzle 131 is equal to the remaining flow rate MF3-MF5 of the sheath gas.

In FIG. 5A, all the uniform atomization droplets M3 and the sheath gas are sprayed from the nozzle 131 so that the printing function is turned on. At this time, the flow rate MF7 of the discharged fluid which is sprayed from the nozzle 131 is 60 sccm. That is, 10 sccm of the uniform atomization droplets M3 and 50 sccm of the sheath gas are sprayed from the nozzle 131.

In FIG. 5B, the uniform atomization droplets M3 is not sprayed, but only the sheath gas is sprayed from the nozzle 131 so that the printing function is turned off. At this time, the flow rate MF7 of the discharged fluid which is sprayed from the nozzle 131 is 60 sccm which is all the flow rate of the sheath gas.

As described above, the system 100 according to the exemplary embodiment of the present invention may maintain the same flow rate MF7 or a constant flow rate MF7 of the discharged fluid regardless of whether the uniform atomization droplets M3 are included in the discharged fluid which is sprayed from the nozzle 131.

As described above, in the case of the printing-on, the valve unit 161 connects the vent MFC 171 and the sheath MFC 151 so as to vent a part of sheath gas which is supplied from the sheath MFC 151 and in the case of the printing-off, connects the vent MFC 171 and the vent flow path 123 to backwardly flow all the uniform atomization droplets M3 supplied from the virtual impactor 180 to the focusing unit 130 and a part of the sheath gas supplied to the focusing unit 130 through the atomization droplet flow path 124 to be vented to the outside to block the uniform atomization droplets M3 from being sprayed from the nozzle 131.

Further, in the system 100 according to the exemplary embodiment of the present invention, the first branched flow path 154 through which the sheath gas supplied from the sheath MFC 151 is always connected to the focusing unit 130 to focus the uniform atomization droplets M3 and the second branched flow path 155 is connected or not connected to the vent MFC 171 by the valve unit 161 to vent a part of the introduced sheath gas to the outside.

The system 100 according to the exemplary embodiment of the present invention includes the valve unit 161 for switching (shuttering) the printing on-off and switches (shutters) the printing on-off using the sheath gas. The valve unit 161 is provided before the vent MFC 171 so that in the case of the printing-on, a part of the sheath gas may be vented to the outside not through the focusing unit 130, but through the second branched flow path 155. Accordingly, the uniform atomization droplets M3 passes through the focusing unit 130 to be focused with the sheath gas to be sprayed from the nozzle 131.

The system 100 according to the exemplary embodiment of the present invention includes two flow paths 154 and 155 through which sheath gas flows and sheath gas which flows through one flow path 154 is always supplied to the focusing unit 130 to focus the uniform atomization droplets M3 in the nozzle 131. The other flow path 155 is blocked by the valve unit 161 (during the printing-off) and in the case of the printing-on, is connected to the vent MFC 171 by the valve unit 161 to vent a partial flow rate of sheath gas to the outside.

In the case of printing-on, the valve unit 161 installed in front of the vent MFC 171 looks to have no function other than reducing a flow rate of the sheath gas used to focus the uniform atomization droplets M3 only during the printing, but during the printing-off, the valve unit 161 allows the sheath gas introduced into the focusing unit 130 to be substantially vented by the vent MFC 171 together with the uniform atomization droplets M3.

Accordingly, in the system 100 according to the exemplary embodiment of the present invention, the sheath gas needs to be supplied with a flow rate which is more than a flow rate sprayed from the nozzle 131 together with the uniform atomization droplets M3 during the printing-on, by a flow rate of the sheath gas vented to the outside through the vent MFC 171 by the valve unit 161. In contrast, the flow rate which is vented to the outside by the vent MFC 171 during the printing-off is more than the flow rate of the uniform atomization droplets M3 so that a partial flow rate of the sheath gas is vented by the vent MFC 171 together with the uniform atomization droplets M3. Accordingly, the sheath gas below the atomization droplet flow path 124 rises to the upper portion of the atomization droplet flow path 124 so that the uniform atomization droplets M3 do not reach the nozzle 131 to make the printing-off.

In the case of the printing-off, a flow rate of the sheath gas sprayed from the nozzle 131 is the same as the sum of the flow rates of the uniform atomization droplets M3 and the sheath gas which are sprayed from the nozzle 131 during the printing-on so that there is no pressure variation in the nozzle 131. Accordingly, regardless of the printing on-off, the flow rate of the discharged fluid sprayed from the nozzle 131 is not changed. Accordingly, the pressure variation of the nozzle 131 when the printing is on or off may be reduced and the uniform printing line width when the printing is on or off may be obtained.

Unlike the related art, the system 100 according to the exemplary embodiment of the present invention sprays the discharged fluid at the same flow rate regardless of the on-off of the focused spray jet printing. Accordingly, the focused spray jet printing may be controlled to be on or off without causing the change in the pressure.

Figure 6A:
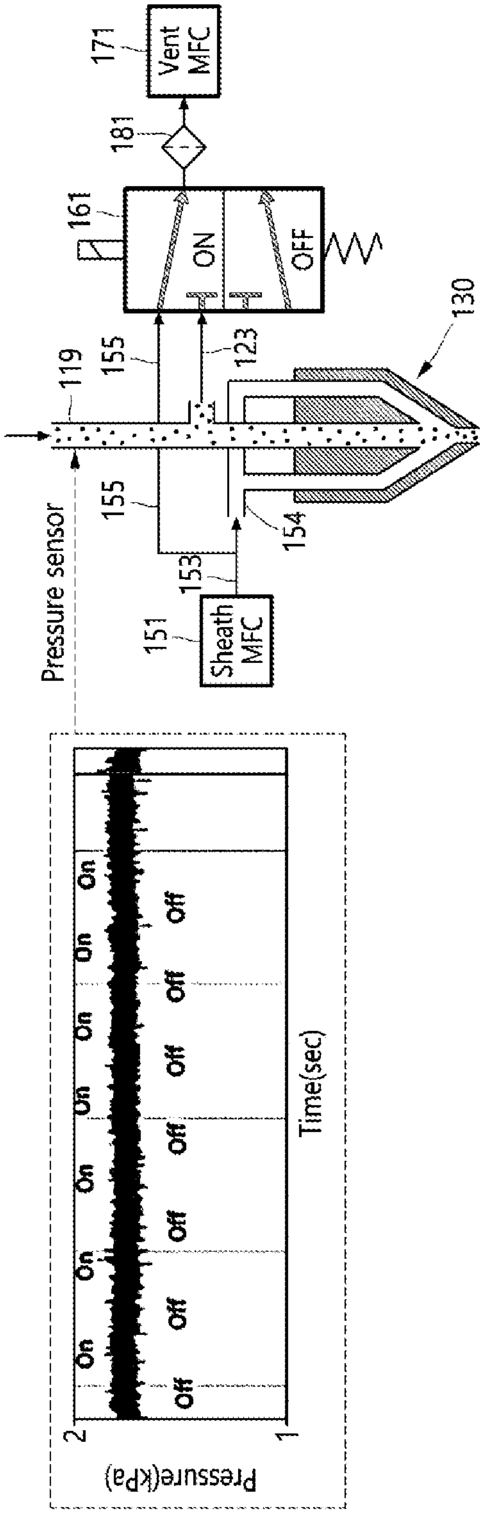
FIGS. 6A and 6B are views illustrating whether a pressure is changed when spraying of uniform atomization droplets is on or off in a focused spray jet printing system according to an exemplary embodiment of the present invention and the related art.
Figure 6B:
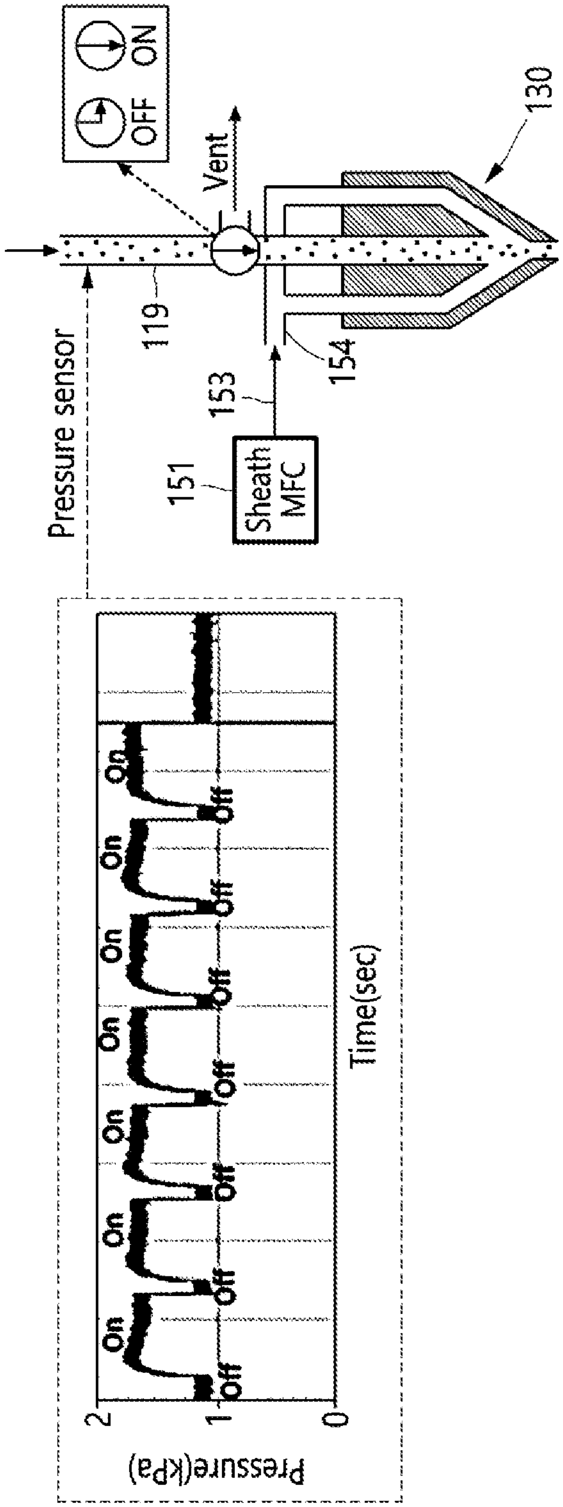

FIG. 6A is a graph illustrating a pressure change of a system 100 according to the exemplary embodiment of the present invention over time when a focused spray jet printing is on or off and FIG. 6B is a graph illustrating a pressure change of the related art.

Referring to FIG. 6A, it is understood that the same pressure is maintained regardless of the focused spray jet printing on or off as a result of measurement with a pressure sensor.

In contrast, referring to FIG. 6B, when the uniform atomization droplets are mechanically on or off, it is understood that the flow rate in the nozzle varies to cause the pressure change so that the performance of controlling discharging on/off is degraded.

Although the exemplary embodiments have been described above by a limited exemplary embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved.

Therefore, other implements, other embodiments, and equivalents to the claims are within the scope of the following claims.

What is claimed is:

1. A focused spray jet printing system, comprising:

an atomization unit which atomizes ink by a carrier gas to generate atomization droplets;

a head unit including a virtual impactor which uniformizes sizes of the atomization droplets generated from the atomization unit and ejects the uniformized atomization droplets;

a focusing unit provided in the head unit, configured to focus the uniformized atomization droplets using sheath gas supplied to the focusing unit, and configured to spray the focused atomization droplets onto a substrate;

a sheath gas mass flow controller (sheath MFC) which supplies the sheath gas to the focusing unit; and a valve unit which is selectively connected to any one of an atomization droplet flow path which is formed in the head unit to flow the uniformized atomization droplets and a flow path formed at the outside of the head unit to flow the sheath gas, wherein the atomization droplet flow path connects the virtual impactor and the focusing unit, wherein the head unit includes a vent flow path which is connected to the atomization droplet flow path and the valve unit, the system further comprising: a vent mass flow controller (vent MFC), wherein the vent MFC is connected to the vent flow path by the valve unit in the case of printing-off such that the vent MFC vents the uniformized atomization droplets and a part of the sheath gas outside, wherein the focusing unit includes a nozzle at a lower end thereof, and the sheath MFC supplies a flow rate of the sheath gas more than a flow rate of the sheath gas used to focus the uniformized atomization droplets in the case of printing-on in which the uniformized atomization droplets are sprayed from the nozzle, wherein a flow rate of a discharged fluid sprayed from the nozzle in the case of printing-on in which the uniformized atomization droplets are sprayed from the nozzle is equal to a flow rate of the discharged fluid sprayed from the nozzle in the case of printing-off in which the uniformized atomization droplets are not sprayed, wherein in the case of printing-on, the discharged fluid includes both the uniformized atomization droplets and the sheath gas, and in the case of printing-off, the discharged fluid includes only the sheath gas, and wherein a set flow rate of the vent MFC is less than a flow rate of the sheath gas supplied by the sheath MFC, and is more than a flow rate of the uniformized atomization droplets supplied to the focusing unit.

2. The focused spray jet printing system according to claim 1, wherein, in the case of printing-off, the set flow rate of the vent MFC is more than a flow rate of the uniformized atomization droplets supplied from the head unit such that, a part of the sheath gas introduced into the focusing unit passes through the vent flow path and the valve unit together with the uniformized atomization droplets to be vented to the outside by the vent MFC.

3. The focused spray jet printing system according to claim 1, wherein the sheath MFC is connected to a first branched flow path which supplies the sheath gas to the focusing unit and a second branched flow path which vents the sheath gas to the outside by the vent MFC.

4. The focused spray jet printing system according to claim 3, wherein in the case of printing-on, the valve unit connects the second branched flow path and the vent MFC to vent a remainder of the sheath gas which is additionally supplied other than sheath gas used to focus the uniformized atomization droplets to the outside through the second branched flow path and blocks the vent flow path connected to the atomization droplet flow path which flows the uniformized atomization droplets through the focusing unit to spray the uniformized atomization droplets to be focused by the sheath gas introduced into the focusing unit from the nozzle.

5. The focused spray jet printing system according to claim 1, wherein the valve unit connects the vent MFC and the sheath MFC in the case of printing-on to vent a part of the sheath gas supplied from the sheath MFC, or connects the vent MFC and the vent flow path in the case of printing-off to backwardly flow all the uniformized atomization droplets supplied to the focusing unit from the virtual impactor and a part of the sheath gas supplied to the focusing unit through the atomization droplet flow path, such that the uniformized atomization droplets and the part of the sheath gas backwardly flowing through the atomization droplet flow path are vented to the outside and the uniformized atomization droplets are prevented from being sprayed from the nozzle.

6. The focused spray jet printing system according to claim 5, wherein in the case of printing-on in which the valve unit connects the sheath MFC and the vent MFC, an excessive flow rate of sheath gas which is not used to focus the uniformized atomization droplets, among the sheath gas ejected from the sheath MFC, is vented by the vent MFC and only the sheath gas used to focus the uniformized atomization droplets is supplied to the focusing unit to be sprayed from the nozzle together with the focused uniformized atomization droplets and a flow rate of the discharged fluid sprayed from the nozzle is a sum of flow rates of the sheath gas and the uniformized atomization droplets which are sprayed from the nozzle.

7. The focused spray jet printing system according to claim 5, wherein in the case of printing-off in which the valve unit connects the vent MFC and the vent flow path, the remaining sheath gas which does not backwardly flow through the atomization droplet flow path, among the sheath gas supplied to the focusing unit, is sprayed from the nozzle and a flow rate of the sheath gas sprayed from the nozzle is equal to a flow rate of the discharged fluid sprayed from the nozzle in the case of printing-on.

* * * * *